Jan. 5, 1954 E. D. SYDOW 2,664,563
HEEL FORMING MACHINE
Filed Aug. 19, 1950 10 Sheets-Sheet 1
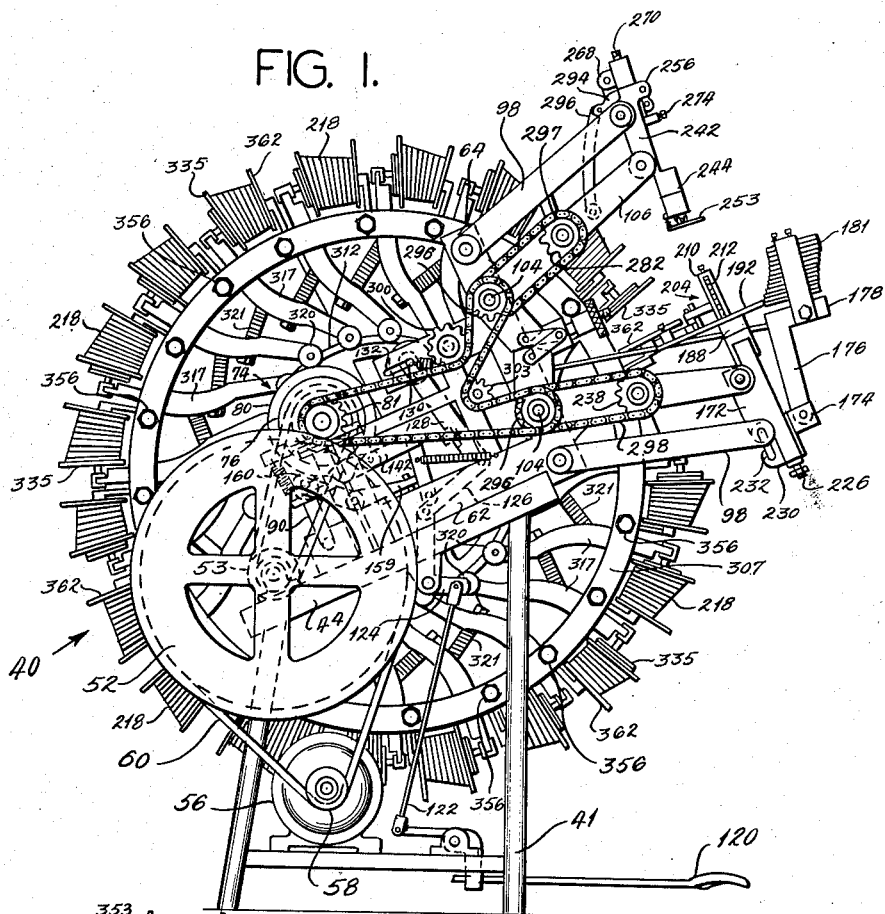
FIG. 1.
FIG. 25.
FIG. 26.
FIG. 27.
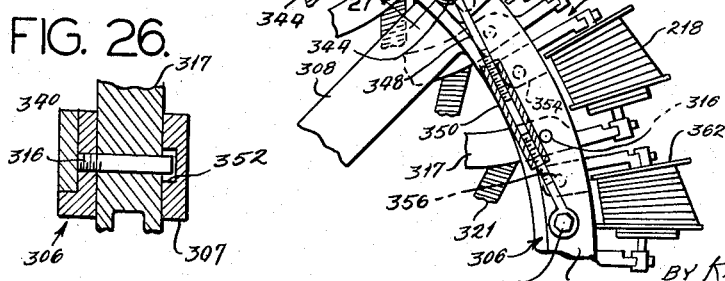
INVENTOR:
ERNEST D. SYDOW,
BY Kingsland, Rogers & Ezell
ATTORNEYS Jan. 5, 1954 E. D. SYDOW 2,664,563
HEEL FORMING MACHINE
Filed Aug. 19, 1950 10 Sheets-Sheet 2

INVENTOR:
ERNEST D. SYDOW,
By Kingsland, Rogers & Ezell
ATTORNEYS

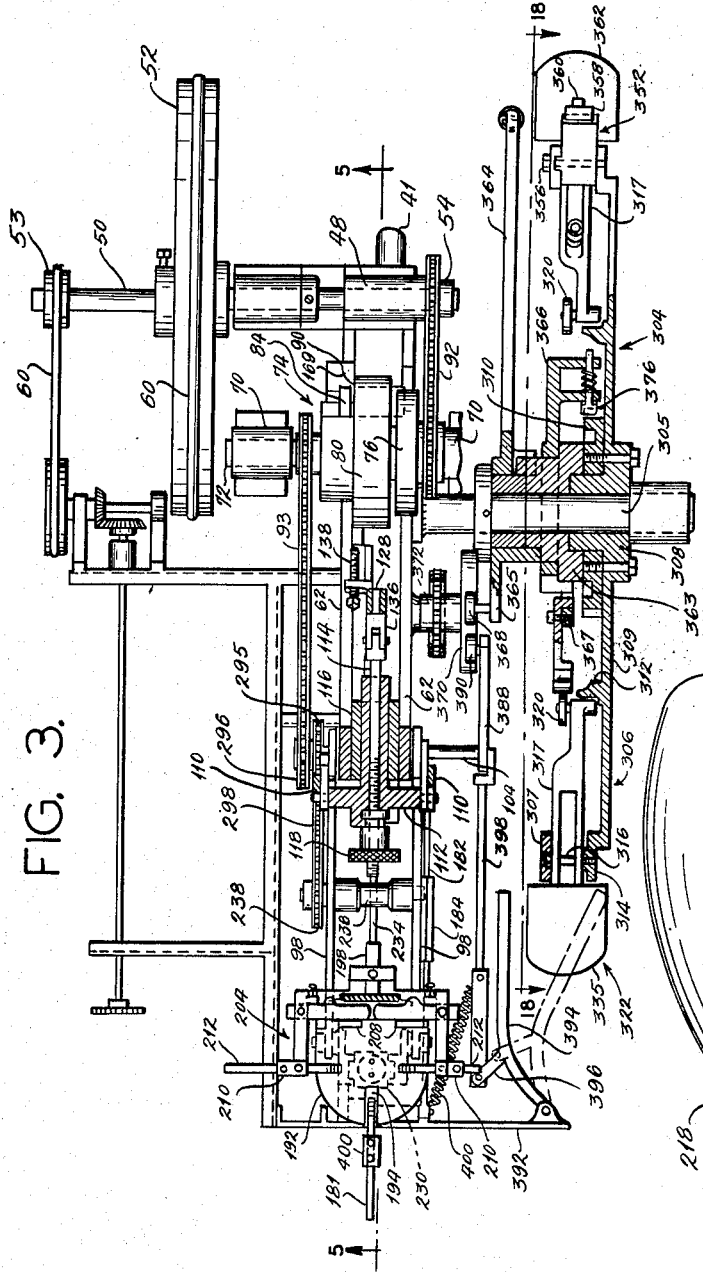

Jan. 5, 1954  E. D. SYDOW  2,664,563
HEEL FORMING MACHINE
Filed Aug. 19, 1950  10 Sheets-Sheet 4

INVENTOR:
ERNEST D. SYDOW,
BY Kingsland, Rogers & Ezell
ATTORNEYS

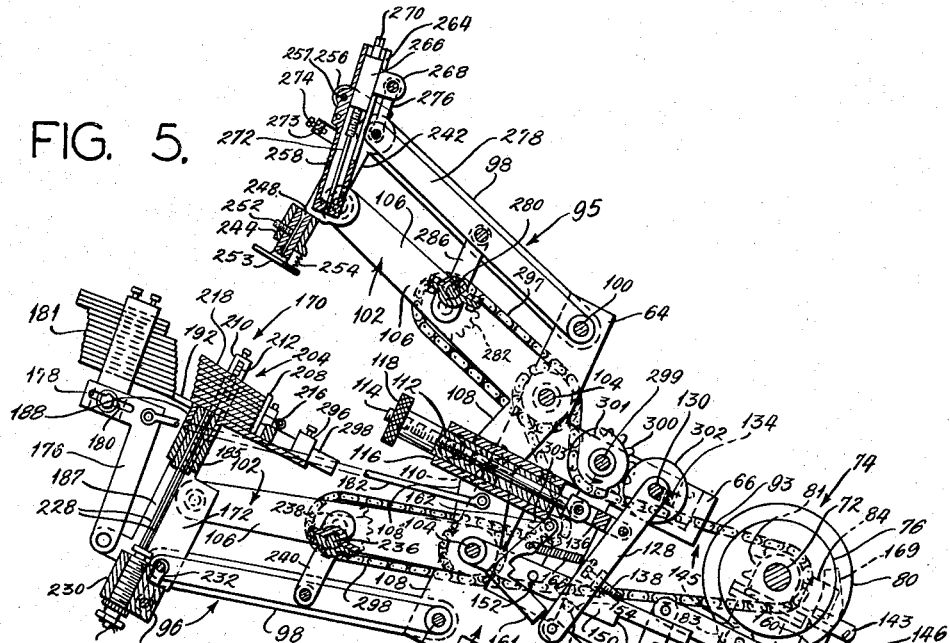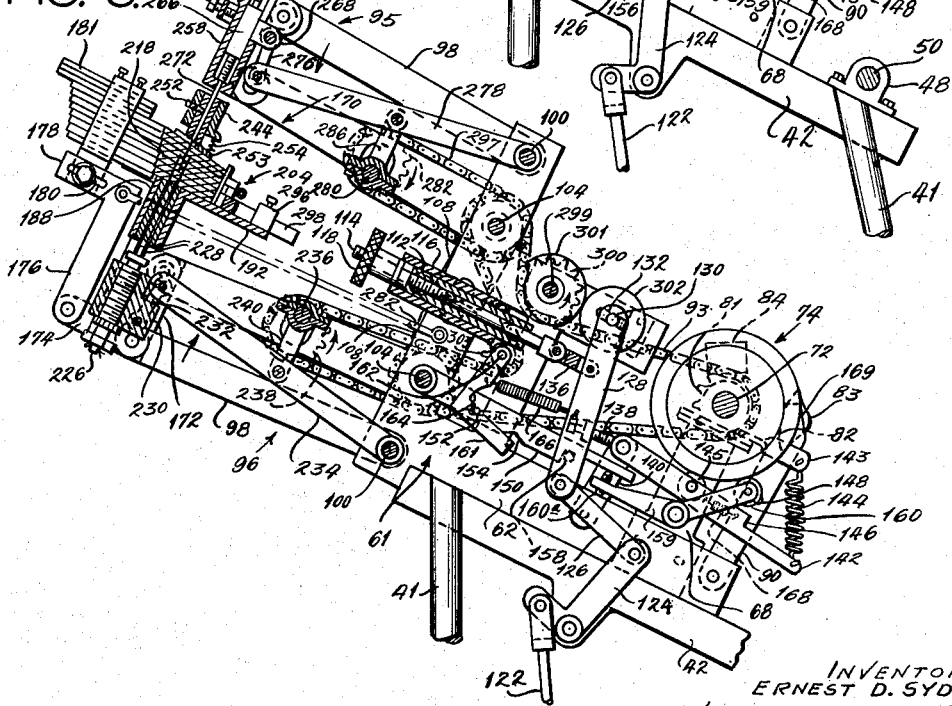

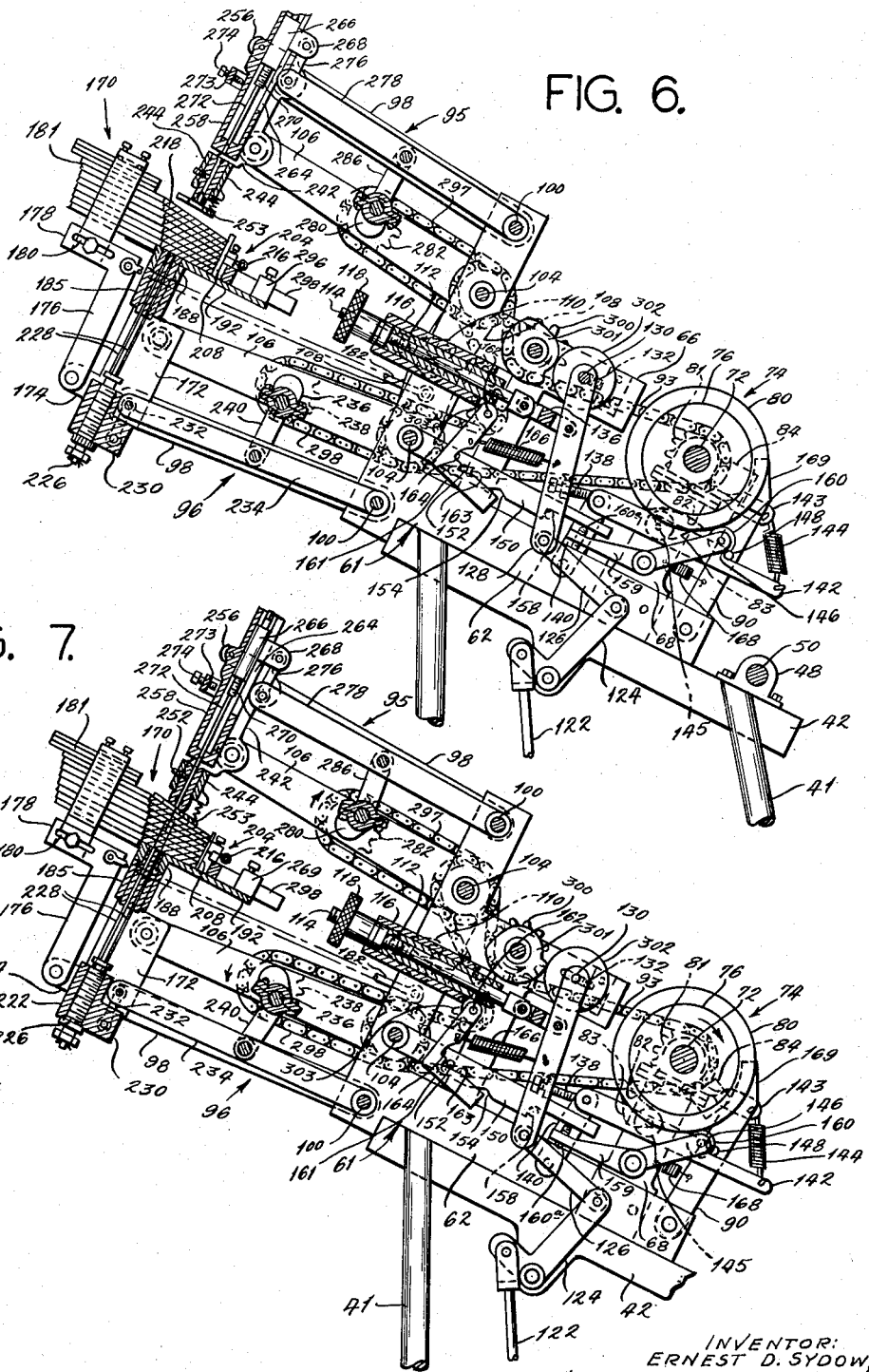

Jan. 5, 1954  E. D. SYDOW  2,664,563
HEEL FORMING MACHINE
Filed Aug. 19, 1950  10 Sheets-Sheet 7
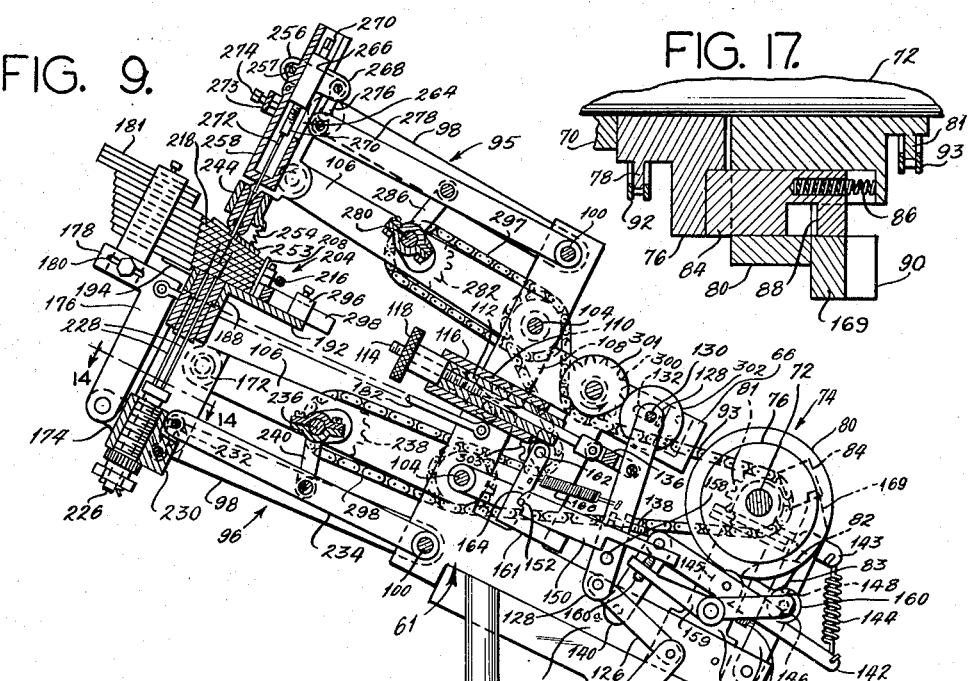
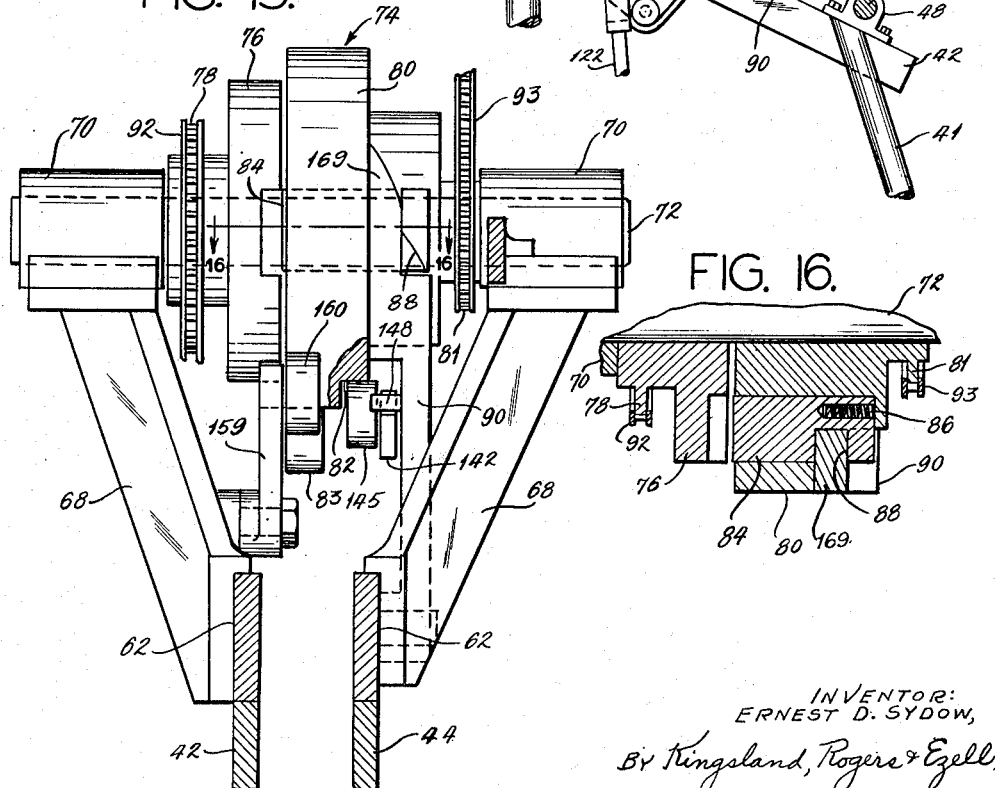
INVENTOR:
ERNEST D. SYDOW,
By Kingsland, Rogers & Ezell
ATTORNEYS

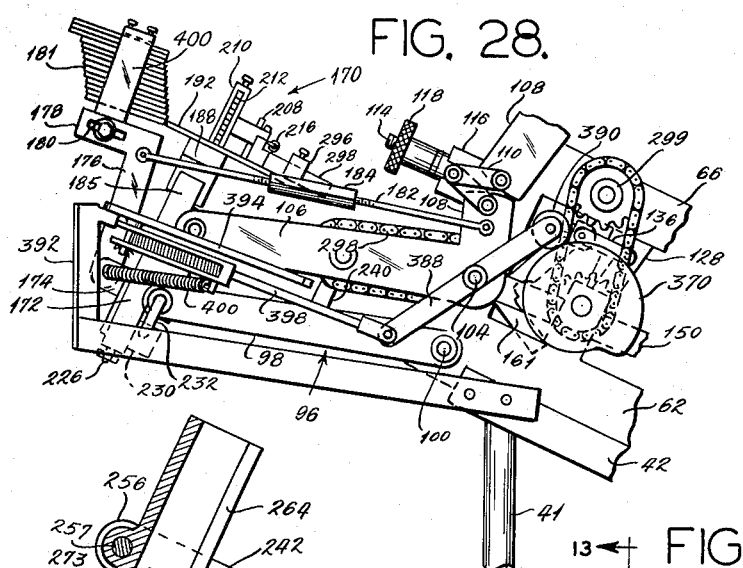

Jan. 5, 1954  E. D. SYDOW  2,664,563
HEEL FORMING MACHINE
Filed Aug. 19, 1950  10 Sheets-Sheet 9

INVENTOR:
ERNEST D. SYDOW,
By Kingsland, Rogers & Ezell
ATTORNEYS

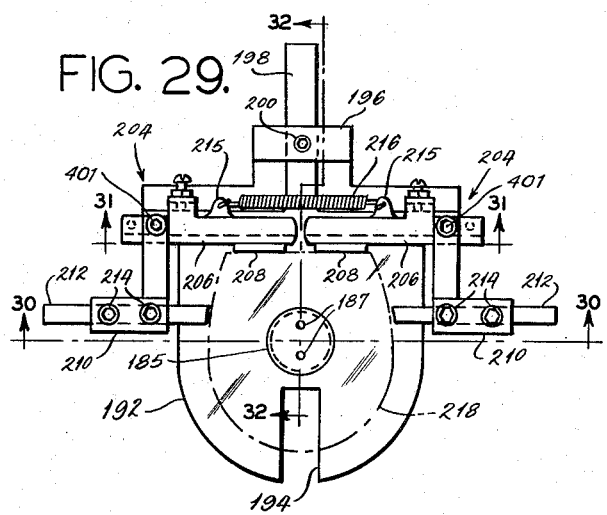
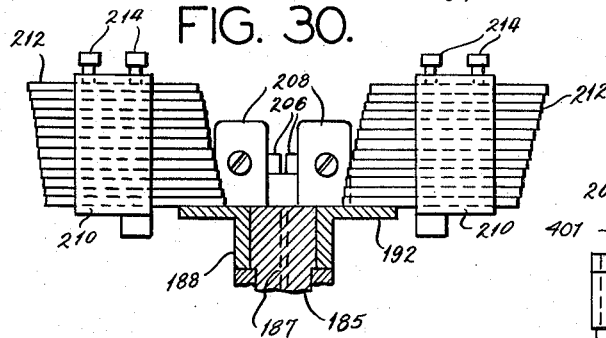
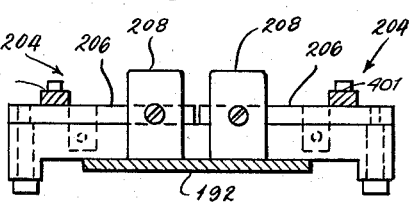
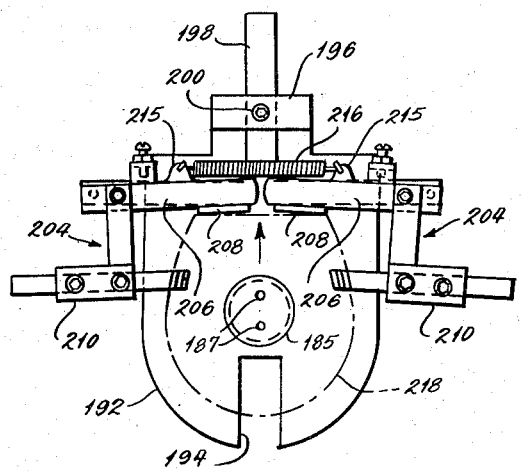
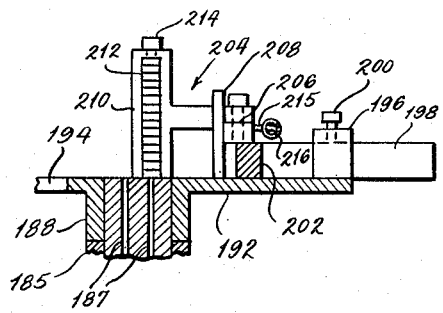

Patented Jan. 5, 1954

2,664,563

UNITED STATES PATENT OFFICE 2,664,563

HEEL FORMING MACHINE

Ernest D. Sydow, St. Louis, Mo., assignor to John E. Mitchell Company, Dallas, Tex., a corporation of Missouri Application August 19, 1950, Serial No. 180,463

13 Claims. (Cl. 1—39.8)

The present invention relates generally to the shoe machine art and more particularly to a novel heel forming machine for driving one or more nails into each end of a heel blank, and for maintaining the heel blank in a compressed position for a predetermined period of time.

In one form, the device comprises means for supporting and automatically aligning and clamping a heel blank in assembled position; means for applying pressure against the ends of the heel blank so as to slightly compress the same; means for simultaneously driving nails into the heel blank from each end thereof; carrier means containing means for applying clamping pressure to a plurality of heel blanks for a predetermined period of time; means for moving the carrier means a predetermined distance in timed relation with the nailing means; means for automatically releasing the pressure on one heel blank at a predetermined position of the carrier means; and means for automatically ejecting the released heel blank from the pressure applying means.

As is well known in the art, many leather heels are built up from a plurality of lifts, the usual practice being to position the lifts in a stack with both sides of alternate lifts coated with cement, driving one nail into the stack from one end thereof, either by hand or with a machine, and then placing the nailed stack in a clamping device to maintain the stacked lifts firmly together until the cement has set.

There are many disadvantages with this method and the present machines used in performing the nailing and clamping operation. One disadvantage is that a single nail driven into only one end of the stack or heel blank often does not prevent some of the individual lifts from rotating before the cement has had a chance to set. Also, when heels are made from light colored material, such as white leather board, using this method, the layers of cement form dark lines between the individual lifts.

One particular disadvantage with the present pressure plates used on machines for clamping the stacks of nailed lifts until the cement has set, is that the pressure is concentrated at the high point of the heel blank instead of being applied evenly over the entire surface of the end of the blank. This is especially noticeable with gouged heels and heels which have a distinct wedge shape.

It is an object of the present invention, therefore, to provide a novel heel forming machine for driving a plurality of nails into both ends of a heel blank. More particularly, it is an object to provide a machine for simultaneously driving one or more nails into each end of a heel blank and which is adjustable to accommodate heels of various heights and to drive nails of various lengths.

Another object is to provide a novel assembly for supporting and aligning a stack of lifts for forming a heel blank and for maintaining the stack in aligned position during the nailing operation. More particularly, it is an object to provide an assembly which includes a plate-like member on which the lifts can be positioned and means for automatically bringing together a plurality of adjustable finger-like elements for aligning the lifts and for maintaining the lifts in aligned position during the nailing operation, and for automatically releasing the heel blank after the nailing operation has been completed.

Another object is to provide a novel pressure foot for bearing against one end of the heel blank prior to and during the nailing operation, which automatically adjusts itself to the slope of the end lift.

Another object is to provide a mechanism for applying pressure to both ends of the heel blank prior to the nailing operation so as to press the lifts firmly together.

Another object is to provide a mechanism for clamping together the nailed lifts in a heel blank and for maintaining them in a clamped position for a predetermined period of time. More particularly, it is an object to provide a rotatable reel containing a plurality of sets of clamping plates for clamping together the nailed lifts; which rotates a predetermined distance each time the nailing mechanism is operated; and which separates one set of plates at a predetermined rotated position so as to release the heel clamp between them, and to separate another set of plates adjacent the first set whereby a newly nailed heel blank can be disposed between them.

Another object is to provide a clamping reel of the aforementioned type which contains means for automatically and simultaneously adjusting the distance between the sets of pressure plates for accommodating heel blanks of various heights.

Another object is to provide a novel pressure plate for use on the aforementioned reel which applies the pressure evenly to the entire surface at one end of the heel blank, regardless of whether the latter is flat or gouged. More particularly, it is an object to provide a pressure plate assembly which includes a pivotally mounted, flexible pressure plate which automatically adjusts itself to the irregularity of the various types of heel blanks so as to apply pressure evenly throughout substantially their entire surfaces.

Another object is to provide an automatically operable heel ejector for ejecting a heel blank after one complete revolution on the clamping reel.

Further objects and advantages of the present invention will be apparent from the following description, reference being had to the accompanying drawings, wherein a preferred embodiment of the present invention is shown, in which:

Fig. 1 is a side, elevational view of a heel forming machine constructed in accordance with the teachings of the present invention, as viewed from the left side of the device;

Fig. 3 is a horizontal, sectional view taken on the line 3—3 in Fig. 2;

Fig. 5 is a view similar to Fig. 4, but with some of the members shown in cross section so as to better illustrate the construction thereof;

Fig. 6 is a view similar to Fig. 5, but showing the position of the various members immediately after the foot lever has been depressed so as to start the device in operation;

Fig. 7 is a view similar to Fig. 6, but showing the start of the nailing operation;

Fig. 8 is a view similar to Fig. 7, but showing the finish of the nailing operation;

Fig. 9 is similar to Fig. 8, but showing the position of the members when the nailing mechanism starts to retract;

Fig. 12 is an enlarged, front, elevational view of the upper nailing assembly;

Fig. 13 is a fragmentary, vertical, sectional view of the upper nailing assembly, taken on the line 13—13 in Fig. 12;

Fig. 14 is an enlarged, horizontal, sectional view of the lower nailing assembly taken on the line 14—14 in Fig. 9;

Fig. 15 is an enlarged, rear, elevational view of the clutch and its supporting assembly;

Fig. 16 is a fragmentary, horizontal, sectional view taken on the line 16—16 in Fig. 15, with the dog member shown in the retracted position;

Fig. 17 is a view similar to Fig. 16, but showing the dog member engaged with the freely rotating member of the clutch so as to connect together the two clutch members;

Figures 4, 20, 21, 23, 24:
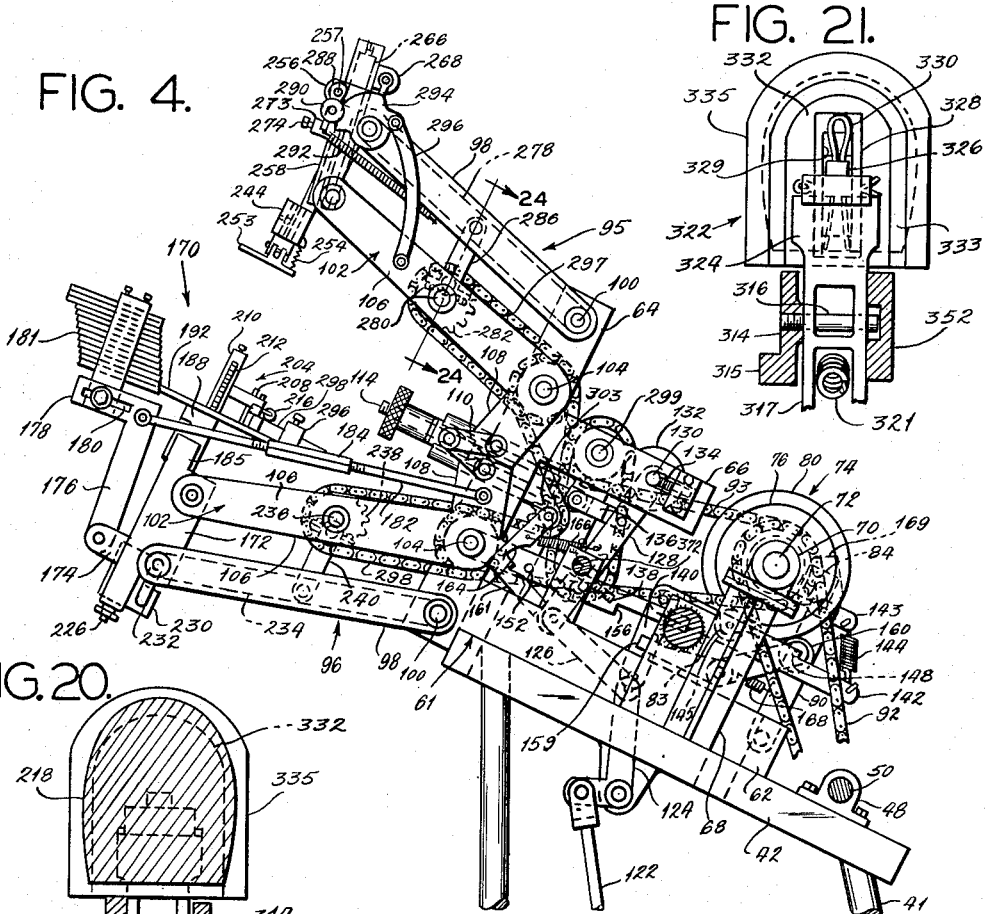
Fig. 4 is an enlarged, side, elevational view of the front portion of the nailing mechanism as viewed from the right side of the machine, the mechanism being shown in the rest or inoperative position.
Figure 18:
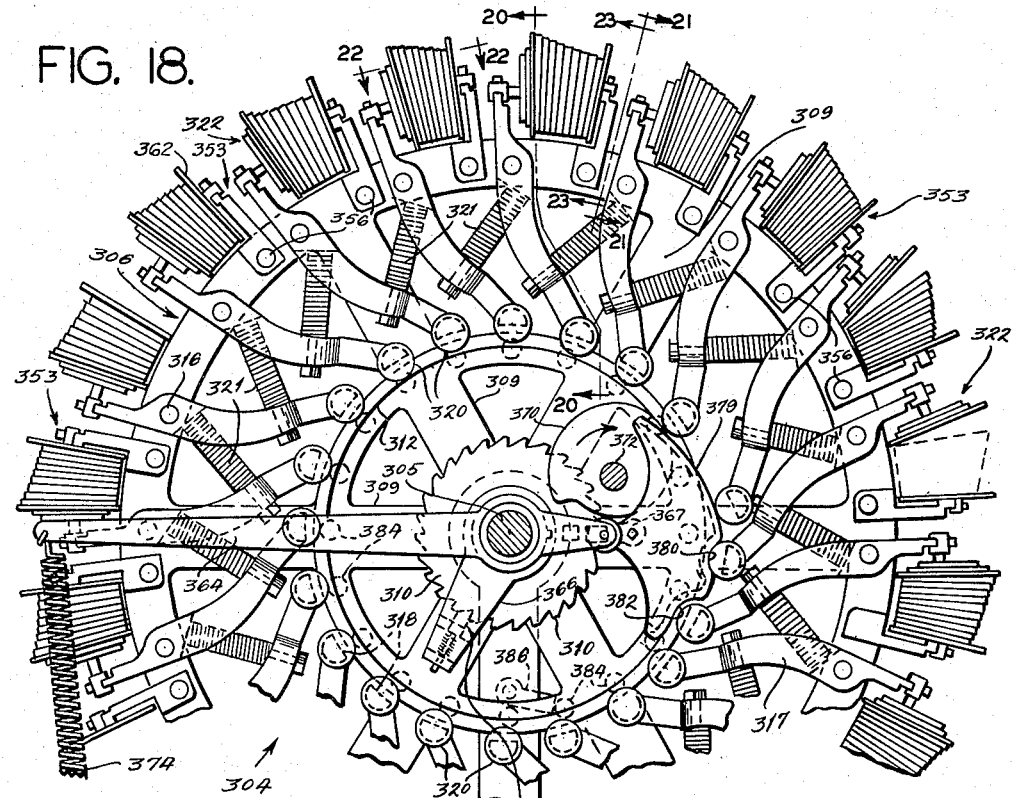
Fig. 18 is an enlarged, vertical, sectional view taken on the line 18—18 in Fig. 3 and is an elevational view of the reel and its actuating mechanism as viewed from the left side of the device, the mechanism being shown in the rest or inoperative position.
Figure 22:
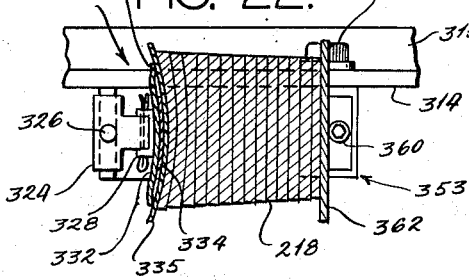

Figs. 20 and 21 are enlarged, fragmentary, vertical, sectional views taken on the lines 20—20 and 21—21, respectively, in Fig. 18;

Fig. 22 is an enlarged, fragmentary, horizontal, sectional view taken on the line 22—22 in Fig. 18;

Fig. 23 is an enlarged, fragmentary, vertical, sectional view taken on the line 23—23 in Fig. 18;

Fig. 24 is an enlarged, fragmentary, vertical, sectional view taken on the line 24—24 in Fig. 4;

Fig. 25 is an enlarged, side, elevational view of a portion of the reel showing the mechanism for adjusting the spacing between the flexible plate assemblies and the rigid plate members, taken from the right side of the device;

Figs. 26 and 27 are enlarged, vertical, sectional views taken on the lines 26—26 and 27—27, respectively, in Fig. 25;

Fig. 28 is an enlarged, fragmentary, side elevational view of the lower front portion of the device taken from the right-hand side showing the heel adjusting mechanism;

Fig. 29 is an enlarged, top, plan view of the lift aligning assembly prior to a heel blank being disposed therein;

Figs. 30 and 31 are vertical, transverse, sectional views taken on the lines 30—30 and 31—31, respectively, in Fig. 29;

Fig. 32 is a vertical, sectional view taken on the line 32—32 in Fig. 29;

Fig. 33 is a top, plan view of the aligning mechanism similar to Fig. 29, but showing a stack of heel lifts in position after being aligned;

Fig. 34 is a perspective view of a heel blank after the nailing operation; and

Fig. 35 is a perspective view of a modified form of pressure plate.

Referring to the drawings more particularly by reference numerals, 40 indicates generally a heel building machine constructed in accordance with the teachings of the present invention, which includes a mechanism for driving nails into both ends of a stack of heel lifts which have been previously coated with cement and aligned, and a mechanism for clamping the aforementioned stack of lifts or heel blank until the cement has hardened. Both of these mechanisms are operatively interconnected and are mounted on a base 41 which is made from elongated tubular members.

A pair of spaced flat elongated members 42 and 44 (Fig. 5) extend forwardly and upwardly adjacent the upper ends of vertically extending members of the base 41.

Fastened adjacent the rear ends of the members 42 and 44 is a journal bearing 48 (Fig. 5) which rotatably supports a shaft 50. Fixedly mounted on the shaft 50 adjacent its center is a grooved flywheel 52 and on one end of the shaft is a small grooved pulley 53 (Fig. 3) and on the other end thereof is a small sprocket wheel 54.

Figure 2:
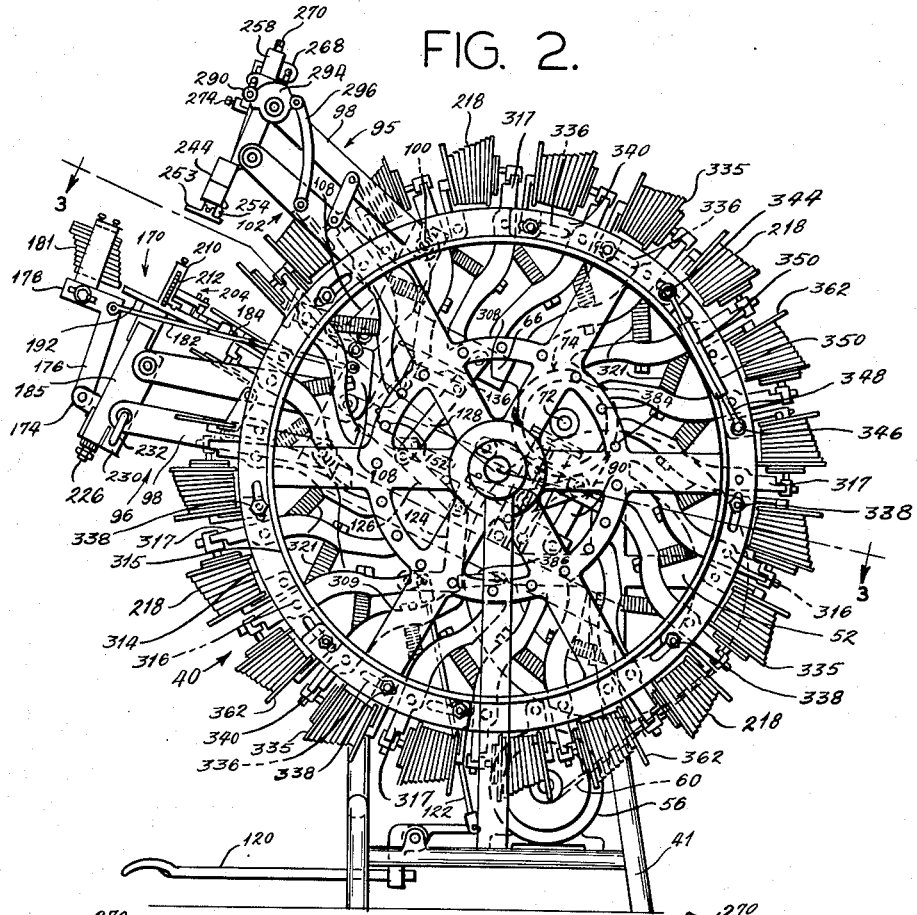
Fig. 2 is a side, elevational view of the machine viewed from the right-hand side of the device.

An electric motor 56 (Figs. 1 and 2) is mounted on the base 41 and contains a grooved pulley 58 on its shaft. A belt 60 extends between the pulley 58 and the flywheel 52 whereby the shaft 50 is driven from the motor 56.

Fastened on top of the elongated members 42 and 44 and extending upwardly therefrom are a pair of spaced supporting members 61 (Figs. 5 et seq.) which are somewhat L-shaped and which form a supporting frame for the nail driving mechanism. Each of these members contains a substantially horizontal portion 62, a substantially vertical portion 64 extending upwardly from the horizontal portion 62 adjacent one end thereof, and a short portion 66 extending normal to the vertical portion 64 adjacent its center.

Extending upwardly from adjacent the rear ends of the horizontal portion 62 are a pair of supports 68 (Fig. 15) each of which supports a journal bearing 70 at its upper end. Rotatably mounted in the journal bearings 70 is a shaft 72, on which is mounted a clutch 74.

The clutch 74 includes a member 76 which is freely rotatably mounted on the shaft 72 and which contains a sprocket wheel 78, and a member 80 which is fixed to the shaft 72 and which contains a sprocket wheel 81. The outer peripheral surface of the member 80 acts as a cam, as will appear, and contains an arcuate groove 82 adjacent one edge thereof and an arcuate projection 83 adjacent its other edge.

As shown in Figs. 15, 16 and 17, the fixed member 80 contains a slidable dog member 84 which is urged towards engagement with the freely rotating member 76 by a spring 86. The dog member 84 contains a notch 88 and is held in retracted position by a link member 90 which has its lower end pivotally mounted between the portions 62 (Fig. 5 et seq.). The link member 90 is normally disposed in the notch 88 (Fig. 16) when the device is inoperative so as to maintain the dog member 84 in retracted position and permit rotational movement of the member 76 relative to the member 80. When the link member 90 is moved out of engagement with the notch 88, by means to be described, the dog member 84 is driven into engagement with the freely rotating member 76 (Figs. 7 and 17) so as to lock together the members 76 and 80.

A continuous chain 92 connects the sprocket wheel 54 on the flywheel shaft 50 with the sprocket wheel 78 on the clutch member 76 and another continuous chain 93 connects the sprocket wheel 81 on the clutch member 80 with the nail driving mechanism (to be described) for actuating the same. As shown in Figs 5 to 9, the nail driving mechanism is mounted on the L-shaped supporting frame 61. This mechanism includes upper and lower jaw-like nailing assemblies 95 and 96, respectively, mounted on the vertical portions 64, the forward ends of the assemblies being adapted to move inwardly and outwardly so as to position nails adjacent the ends of the stack of lifts which are to be nailed together. Each assembly is formed in the shape of a parallelogram with the rearwardly extending end of each assembly lying in a common plane so that the nailing mechanisms in the forwardly extending ends will always be in alignment regardless of the relative position of the assemblies.

Each assembly contains a pair of elongated outer members 98, one of which is disposed on each side of the vertical portions 64 and which are pivotally mounted at one end on a shaft 100 which extends through aligned openings in the vertical portions 64. Each of these assemblies also contains a pair of inner, L-shaped, bell-crank members 102, one of which is disposed on each side of the vertical portions 64 and which are pivotally mounted on shafts 104 which extend through aligned openings in the vertical portions 64. Each L-shaped member 102 includes a relatively long portion 106 which forms one side of the parallelogram with the members 98, and a relatively short portion 108 which is normal to the long portion 106 adjacent the inner end thereof and which is pivotally mounted on the shaft 104.

Figure 10:
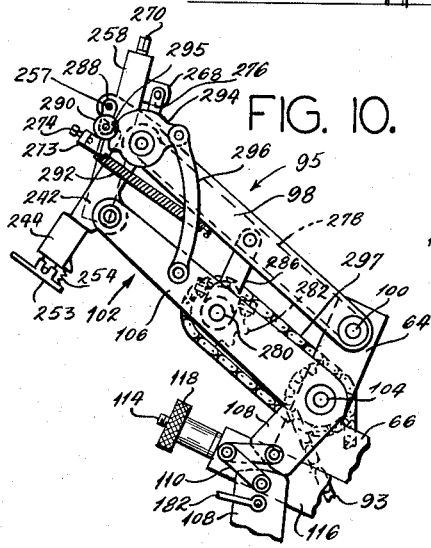
Fig. 10 is a side, elevational view of the upper jaw-like nailing mechanism in the inoperative position.

The inner ends of the short portions 108 on each side of the upwardly extending portions 64 are joined together by V-shaped toggles 110 (Fig. 10). A yoke 112 (Figs. 3 and 12) is fastened between the free ends of the toggles 110 and contains an opening which receives a shaft 114. The shaft 114 is slidably mounted in an elongated sleeve 116 (Fig. 5) which is rigidly fastened between the upwardly extending portions 64. A knurled hand wheel 118 is threadedly and adjustably mounted on the free end of the shaft 114 which extends forwardly from the yoke 112. Thus, the position of the end of the shaft 114 relative to the yoke 112 can be varied by rotating the hand wheel 118.

When the shaft 114 is pulled rearwardly from the position shown in Fig. 5 to the position shown in Fig. 6, by means to be described, the yoke 112 and the toggles 110 are pulled rearwardly, thereby causing the members 102 to pivot about the shafts 104 so as to bring the free ends of the jaw-like assemblies into the position shown in Fig. 6.

The nailing mechanism is set into operation by depressing the foot lever 120 which is pivotally mounted on the base 41, and which, through linkages which will now be described, pulls the shaft 114 rearwardly so as to close the jaw assemblies 95 and 96, and also cause the clutch members 76 and 74 to be connected together.

Pivotally connected to the inner end of the foot lever 120 is an upwardly extending shaft 122 which is pivotally connected to the short arm of a bell crank lever 124 (Fig. 5) pivotally mounted between the elongated members 42 and 44. The upper end of the long arm of the bell crank lever 124 is pivotally connected to one end of a link 126, the other end of which is pivotally connected to a pair of upwardly extending lever members 128. The upper ends of the lever members 128 are mounted on a shaft 130 which has its ends disposed in aligned slots 132 in the short portions 66 of the L-shaped members 61. A pair of coiled springs 134 urge the upper ends of the members 128 towards the left, as viewed in Fig. 5.

Connected the levers 128 adjacent their upper ends is one end of a link 136 which has its other end connected to the inner end of the shaft 114.

Thus, when the foot lever 120 is depressed, its movement is transmitted through the shaft 122, the bell crank lever 124, and the link 126, so as to pivot the lower ends of the levers 128 towards the right, as viewed in Fig. 5. When this occurs, the shaft 114 is drawn to the right so as to close the jaw-like mechanisms 95 and 96, as previously described.

Adjustably mounted on one of the lever members 128 below the link 136, is a threaded bolt-like member 138. The free end of the member 138 is adapted to engage the upper end of an upwardly extending link 140 which is pivotally mounted between the horizontal portions 62 of the L-shaped supporting frame 61. Pivotally connected to the upper end of the link 140 is a horizontally extending link 142. The free end of link 142 is connected to a member 143 extending from one of the supports 68, by a coiled spring 144. The link 142 contains a roller 145 rotatably mounted thereon which rides on the outer peripheral surface of the clutch member 80 and which is adapted to ride in and out of the notch 82.

The link 142 also contains a shoulder 146 which is adapted to bear against a pin 148 mounted on the lever member 90. Thus, before the foot lever 120 is actuated, the roller 145 is disposed in the notch 82 and the shoulder 146 bears against the pin 148, the link 142 being held in position by the spring 144. When the lower ends of the upwardly extending lever members 128 are moved to the right by the actuation of the foot lever 120, as previously described, the bolt-like member 138 moves the link 142 to the right, thereby causing the member 90 (Figs. 15 and 16) to be moved out of engagement with the notch 88 (Fig. 17). This permits the spring 86 to drive the dog member 84 towards the clutch member 76 thereby connecting together the two parts of the clutch 74, as previously described.

The lever members 128 are maintained in their pivoted position until the nails are driven into a stack of lifts, even after the foot lever 120 is released, by a latch member 150 which is pivotally mounted on the lower shaft 104 (Figs. 5-9). The latch member 150 contains a pin 152 adjacent its pivoted end, a notch 154 in its lower edge adjacent its center, and a shoulder 156 adjacent its free end.

The upwardly extending lever members 128 contain a pin 158 adjacent their lower ends which is adapted to rest in the notch 154 or bear against the shoulder 156. Thus, in the rest position, as shown in Fig. 5, the pin 158 is disposed in the notch 154, but when the lever members 128 are moved to the right (Fig. 6) by actuating the foot lever 120, the latch member 150 drops downwardly so that the pin 158 bears against the shoulder 156 thereby maintaining the lever members 128 in their actuated position.

The shoulder 156 of the latch member 150 is released from engagement with the pin 158 by a V-shaped member 159 which is pivotally mounted on one of the uprights 68 below the clutch 74 (Fig. 15 and Figs. 5-9). The V-shaped member 159 has a roller 160 rotatably mounted on one end thereof which is adapted to ride on the outer peripheral surface of the cam member 80 and the projection 83 contained thereon. A threaded stud-like projection 160a is mounted on the other end of the V-shaped member 159 and is adapted to engage the free end of the latch member 150 so as to raise the same. Thus, when the clutch member 80 is rotated, the projection 83 will cause the end of the V-shaped member 159 which contains the roller 160 to be depressed, thereby elevating the other end of the member 159 which raises the latch member 150 out of engagement with the pin 158.

The latch member 150 is itself maintained in predetermined positions so as to permit the lever members 128 to return to their rest position at a proper time after the release of the foot lever 120 (Fig. 9) by an L-shaped latch member 161 which is pivotally mounted on a shaft 162 above the member 150. The member 161 contains a lower notch 163 and an upper notch 164, both of which are adapted to engage the pin 152 on the latch member 150 during different phases of the nailing operation. In the rest position of the mechanism (Fig. 5), the L-shaped member 161 is pivoted away from the pin 152 by the lower end of the levers 128. When the foot lever 120 is depressed so as to cause the levers 128 to be pivoted to the right (Fig. 6), as previously described, a spring 166 which is connected between the lever 128 and the member 161 causes the latter to pivot to the right and bring the lower notch 163 into engagement with the pin 152 (Fig. 6).

When the fixed member 80 of the clutch 74 is rotated due to the dog member 84 connecting together the two members of the clutch 74, as previously described, the roller 145 on the link 142 rides out of the arcuate notch 82 and onto the peripheral surface of the member 80 so as to cause the lever 142 to be moved downwardly. This disengages the shoulder 146 from the pin 148 so as to permit the member 90 to be pulled back towards the notch 88 by a spring 168. The member 90 contains a wedge-like portion 169 adjacent the upper end thereof so that after the member 80 makes one complete revolution, the wedge portion 169 engages the dog member 84 so as to withdraw it from engagement with the clutch member 76. However, before the member 80 has completed one revolution, the projection 83 engages the roller 160 so as to cause the member 159 to be pivoted so as to raise the latch member 150, as previously described. This raising of the latch member 150, as shown in Fig. 9, causes the pin 152 to be disposed in the notch 164 of the V-shaped latch member 162, thereby maintaining the latch member 150 in its raised position so as to permit the lever member 128 to return to its inoperative position whenever the foot lever 120 is released.

In the retracted position, as shown in Fig. 9, the shoulder 146 of the member 142 is maintained below and out of engagement with the pin 148 on the member 90 by the roller 145 riding on the peripheral surface of the clutch member 80 so that the member 90 cannot be actuated by the member 142 even though the foot lever 120 be actuated so as to cause the member 142 to move back and forth. The member 142 will actuate the member 90 so as to cause the dog member 84 to connect together the two clutch members only when the roller 145 on the member 142 is disposed in the notch 82 on the clutch. Also, the L-shaped latch member 161 maintains the latch member 150 in an elevated position even after the stud-like projection 160a has dropped down out of engagement with the end of the latch member 150, thereby permitting the levers 128 to return to their inoperative position (Fig. 5), regardless of the position of the member 159 and the position of rotation of the clutch member 74.

When the foot lever 120 is released, the members 128 pivot to the left about shaft 130 due to the weight of the foot lever 120, permitting the member 142 to move upwardly and to the left under the action of the spring 144 so as to position the shoulder 146 to again engage the pin 148 on the member 90. At the same time, the lower end of one of the lever members 128 strikes the end of the L-shaped latch member 161 so as to cause the pin 152 to be dislodged from the notch 164, thereby permitting the latch member 150 to drop downwardly so that the pin 158 on the member 128 is disposed in the notch 154 in the latch member 150 (Fig. 5).

When the lever members 128 are pivoted to the right and maintained in that position by the shoulder 156 of the latch member 150 engaging the pin 158 mounted on the member 128, as shown in Figs. 6, 7 and 8, the shaft 114 is in its extreme right-hand position so as to bring the free ends of the nailing assemblies 95 and 96 together, as previously described. When the latch member 150 is raised by the V-shaped member 159, as previously described, so as to disengage the shoulder 156 from the pin 158 (Fig. 9) the lever members 128 will pivot in the clockwise direction (assuming that the foot lever 120 is released) so as to cause the jaw-like nailing assemblies 95 and 96 to open (Fig. 5).

Mounted on the front end of the lower jaw-like assembly 96 is a mechanism 170 (Fig. 4) for aligning the stack of heel lifts to form a heel blank, prior to the nailing operation. This mechanism will now be described.

Pivotally fastened to the front ends of the lower members 98 and the portions 106 of the lower members 102 are a pair of spaced upwardly extending elongated plates 172. Brackets 174 extend outwardly from the forward edges of the plates 172 adjacent the lower ends thereof. Pivotally mounted between the brackets 174 is an inverted L-shaped member having a relatively long leg portion 176 and a relatively short leg portion 178 adjacent the upper end thereof. A slot 180 is provided in the short leg portion 178 so as to adjustably support a stack of adjustable finger-like members 181. Connected between the inner end of the short leg portion 178 and the short portions 108 of the lower bell-crank members 102 is a rod-like member 182 which passes adjacent one of the spaced plates 172 and which contains a turn buckle 184. Thus, when the bell-crank members 102 are actuated by the shaft 114 being moved to the right, as described above, the stack of adjustable fingers 181 is pulled inwardly by the rod-like member 182 (Fig. 6).

Fixedly mounted between the upper ends of the plates 172 is a tubular member 185 (Figs. 5 and 13) which has a cylindrical member 185' fastened therein, as by press fitting, so as to extend upwardly therefrom. The tubular member 185 contains an upwardly extending projection 186 at its upper end, and a pair of narrow passageways 187 extend longitudinally through the cylindrical member 185' for a purpose to appear. Slidably and removably disposed on the upper end of the cylindrical member 185' is a sleeve 188 which contains an elongated notch 190 adjacent the lower end thereof to receive the projection 186 so as to prevent the sleeve 188 from rotating relative to the tubular member 185 and the cylindrical member 185'.

An elongated plate 192 (Figs. 6, 13 and 29-33) is formed integral with the upper end of the sleeve 188. The plate 192 contains an opening which receives the upper end of the cylindrical member 185' and an elongated notch 194 in its front edge which receives the housing 400 which supports the finger-like members 181. Mounted adjacent the rear edge of the plate 192 is a bracket 196 which slidably receives a bar-like member 198. A setscrew 200 extends through the bracket 196 and adjustably fastens the bar 198 in selected position. Fastened to the front end of the bar 198 is a transversely extending member 202 which has aligning assemblies 204 pivotally mounted on a pivot 401 on each end thereof.

Each aligning assembly 204 includes a bar 206 which has a vertically extending plate 208 mounted on the front of it adjacent the inner end thereof. Extending forwardly from the bar 206 adjacent the end opposite to the end which contains the plate 208 is a housing 210 which receives a plurality of finger-like elements 212. Setscrews 214 extend through the upper ends of the housing 210 so as to retain the finger-like elements in selected position. Extending rearwardly from the bars 206 are brackets 215, and connected between the brackets 215 is a spring 216 which tends to pivot the plates 208 forwardly about pivot 401 and the finger-like elements 212 outwardly to a position as shown in Fig. 29.

A heel blank 218 is formed by placing a dry lift on the plate 192 (Fig. 29) and shoving it forwardly against the plates 208 so as to cause the latter to pivot backwardly and the finger-like elements 212 to pivot inwardly to assume a position as shown in Fig. 33. A second lift is then coated on both sides with cement by running it through a cement applying device, which forms no part of the present invention and which is well known to those skilled in the art, and the cement-coated lift is placed on top of the first or bottom dry lift. Another dry lift is then placed on top of the cement covered lift, a cement covered lift is placed on top of the last dry lift, etc., until the required number of lifts are stacked together.

The finger-like elements 212 are adjusted so that the space between the inner opposed ends thereof increases upwardly as shown in Fig. 30 to compensate for the increased size of the lifts. Thus, when the heel blank 218 is pressed firmly against the plates 208, the stack of finger-like elements 212 on each side are pivoted inwardly, as described above, so as to maintain the heel blank 218 in a fixed position. When the foot lever 120 is actuated, the front stack of finger-like elements 181 is brought inwardly against the front edge of the heel blank so that the latter is completely enclosed by the finger-like elements and two plates 208 (Fig. 6).

At the end of the working day, that part of the assembly which includes the plate 192 and the finger-like elements 212 is removed by sliding the sleeve-like member 188 off of the cylindrical member 185'. It is then immersed overnight in a bath of solvent to loosen and remove the cement which has accumulated on it during the heel forming operations.

The plates 172, which are fastened at the free end of the lower jaw-like mechanism 96, contain vertically extending grooves 220 (Fig. 14) in the inner face thereof. Disposed between the plates 172 adjacent the lower ends thereof is a block-like member 222 which contains a projection 224 on each side which is in sliding engagement with the grooves 220.

Adjustably mounted in the block-like member 222 is a supporting member 226 (Figs. 5-8) which contains two elongated nail-driving elements 228 which extend upwardly therefrom and which are slidably disposed in the passageways 187 in the cylindrical member 185'. The supporting member 226 is adjustable relative to the block-like member 222 to compensate for inaccuracies in machining and for "play" in the linkage.

A projection 230 (Figs. 5-8) extends rearwardly from the member 222 and pivotally fastened thereto is an upwardly extending link 232. Connected between the upper end of the link 232 and the lower shaft 100 is a lever 234. The lever 234 is caused to oscillate by a mechanism which will now be described, so as to cause the nail-driving elements 228 to reciprocate within the passageways 187.

Rotatably mounted between the portions 106 of the lower bell-crank member 102 (Fig. 4) and extending therethrough is a crank shaft 236 (similar to the crank shaft 280 as shown in Fig. 24) which has a sprocket wheel 238 mounted on one end thereof outside of the portion 106. The sprocket wheel 238 drives the crank shaft 236, as will appear. A link 240 is rotatably mounted on the offset portion of the crank shaft 236 and depends therefrom, the lower end of the link 240 being rotatably fastened to the member 234 adjacent its center. Thus, when the sprocket wheel 238 and crank shaft 236 are rotated, the link 240 causes the member 234 to move up and down, carrying the block-like member 222 and the nail-driving elements 228 with it. This constitutes the lower part of the nailing mechanism proper.

The upper nailing mechanism is mounted on the free end of the upper jaw-like assembly 95 and will now be described.

Pivotally mounted on the ends of the members 98 and portions 106 of the members 102 are a pair of spaced plates 242 (Fig. 13). Fastened adjacent the bottom of the plates 242 is a tubular housing 244 which receives a removable cylindrical member 246. A vertically extending passageway 248 is contained in the cylindrical member 246. The upper end of the passageway 248 is enlarged slightly so as to provide a funnel-like portion. A horizontal passageway 249 extends through one wall of the housing 244 and the cylindrical member 246, to the passageway 248. Disposed within the horizontal passageway 249 are a ball 250, a spring 251 and a setscrew 252, the ball 250 being disposed adjacent the passageway. As shown in Fig. 13, the ball 250 is disposed in the passageway 248 so as to block the same, but is movable away from the passageway against the spring 251 by the passage of a nail or the like through the passageway 248.

The lower end of the cylindrical member 246 extends below the housing 244 and pivotally mounted thereon is a foot member 253 which is biased by a spring 254, tending to rotate it in the clockwise direction, as viewed in Fig. 13. Because the foot 253 is pivotally mounted on the cylindrical member 246, it will automatically align itself with the upper lift of the stack 218. Also, the forward end of the foot member 253 is pivoted upwardly by the spring 254 so as to be out of the way of the operator when placing the lifts one on top of the other on the plate 192, as previously described.

The upper ends of the plates 242 extend forwardly so as to provide a pair of spaced brackets 256. Pivotally mounted between the brackets 256 on a shaft 257 which extends therebetween, is a tubular housing 258. The tubular housing 258 contains a closure member 260 at the bottom end which has an opening 262 therethrough. An elongated slot 264 extends downwardly from the top rear edge of the tubular housing 258.

Slidably mounted within the housing 258 is a sleeve-like member 266 which contains internal threads, and which has a rearwardly extending bracket 268 which extends through the slot 264. Threadedly disposed within the member 266 is an adjustable supporting member 270 which has a depending elongated nail-driving member 272 fastened to the lower end thereof, the lower end of the nail-driving member 272 being adapted to extend through the passageway 262 and into the passageway 248. Thus, by threading the supporting member 270 within the sleeve 266, the position of the lower end of the nail-driving element 272 can be adjusted relative to the opening 262.

Extending forwardly in front of and between the two plates 242 is a bracket 273 (Figs. 12 and 13) which contains an inwardly extending setscrew 274. The inner end of the setscrew 274 is adapted to contact the tubular housing 258 when it is pivoted forwardly, as will be described, so as to limit its forward travel and thereby align the opening 262 with the passageway 248.

Depending from the bracket 268, which extends rearwardly from the housing 266 through the slot 264, is a short link 276, the lower end of which is pivotally fastened to one end of a lever 278. The other end of the lever 278 (Fig. 8) is mounted on the upper shaft 100.

Rotatably mounted between the portions 106 of the upper L-shaped bell-crank members 102 is a crank shaft 280 (Fig. 24) which is similar to the crank shaft 236 previously described. A sprocket wheel 282, similar to the sprocket wheel 238, is mounted on one end of the crank shaft 280 outside of the portion 106. Rotatably mounted on the offset portion of the crank shaft 280 and extending upwardly therefrom is a link 286 which is similar to the link 240 described above. The upper end of the link 286 is fastened to the lever 278 adjacent its center so that when the sprocket wheel 282 and crank shaft 280 are rotated, the lever 278 oscillates and causes the nail-driving element 272 to reciprocate.

As shown in Fig. 5, the tubular housing 258 is pivoted away from the passageway 248 when the device is in the rest or inoperative position so that a nail can be inserted in the passageway 248, and, when the foot lever 120 is actuated, the housing is pivoted so that it is in alignment with the housing 244 (Fig. 6). The mechanism for accomplishing this will now be described.

Figure 11:
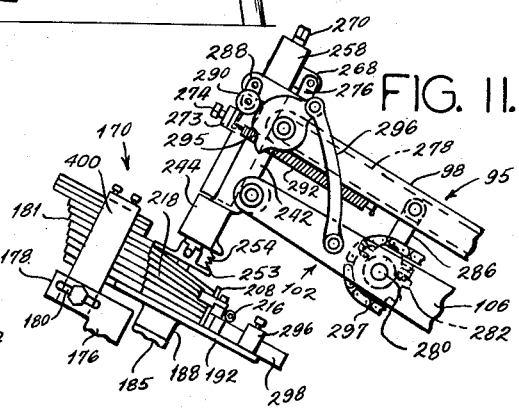
Fig. 11 is a view similar to Fig. 10, but showing the mechanism immediately after the foot lever has been depressed.

Extending downwardly from one end of the shaft 257 (Figs. 4, 10 and 11) which pivotally supports the tubular housing 258 is a short link 288 which has a roller 290 rotatably mounted adjacent the lower end thereof (Figs. 10 and 11). A spring 292 is connected between the lower end of the link 288 and the bottom of one of the upper members 98 so as to urge the shaft 257 and the cylindrical housing 258 to rotate in the counterclockwise direction, as viewed in Figs. 10 and 11. Pivotally mounted adjacent the forward end of one of the members 98 is a cam 294 which contains a notch 295 which is adapted to receive the roller 290. An arcuate link 296 is connected between the cam 294 and the portion 106 adjacent thereto. Thus, when the upper jaw-like nailing assembly 95 is in the position shown in Fig. 10, the tubular shaped housing 258 is pivoted away from the nail receiving passageway 248 and the roller 290 is disposed in the notch 295. This permits a nail to be inserted in the passageway 248 and to be held therein by the ball 250 previously described. However, when the foot lever 120 is depressed so as to pivot the upper jaw-like nailing mechanism 95 inwardly to the position shown in Fig. 11, as previously described, the arm 296 causes the cam 294 to pivot in the counterclockwise direction thereby forcing the roller 290 out of the notch 295 and onto the outer periphery of the cam 294. This causes the roller and link 288 to pivot in the clockwise direction so as to bring the opening 262 of the cylindrical housing 258 in alignment with the passageway 248 and the nail disposed therein.

The sprocket wheels 238 and 282 (Figs. 5-8) for actuating the crank shafts which in turn drive the nailing mechanisms, are driven from the sprocket wheel 81 which is mounted on the fixed portion 80 of the clutch 74. This driving means will now be described.

Mounted on the ends of each of the two shafts 104, which extend from the left side of the device, are two sprocket wheels 295 and 296 (Fig. 3). A continuous chain 297 extends between the sprocket wheel 295 on the upper shaft 104 and the sprocket wheel 282 for driving the upper nailing mechanism, and another continuous chain 298 extends between the sprocket wheel 295 on the lower shaft 104 and the sprocket wheel 238 for driving the lower nailing mechanism. Rotatably mounted between the portions 66 of the member 62 adjacent the upper ends of the lever members 128 is a shaft 299. Mounted on the end of the shaft 299 extending from the left side of the mechanism is a sprocket wheel 300. Mounted on the shaft 299 between the spaced portions 66 is a cam 301 which is adapted to engage a roller 302 rotatably mounted on the shaft 130. The shaft 130 is the one which supports the upper ends of the lever members 128, as previously described.

The shaft 162 on which the L-shaped latch member 161 is pivotally mounted extends from the left side of the mechanism, and freely rotatably mounted thereon is a small sprocket wheel 303.

The continuous chain 93, previously described as being disposed around the sprocket wheel 81 on the clutch member 80, extends forwardly from the top of the sprocket wheel 81, under the sprocket wheel 300, over the sprocket wheel 296 on the upper shaft 104, downwardly and around the back of the idler sprocket wheel 303, forwardly around the sprocket wheel 296 on the lower shaft 104, and thence back to the sprocket wheel 81. Thus, when the member 80 of the clutch 74 and its sprocket wheel 81 are rotated by reason of the dog member 84 connecting together the two members of the clutch, the sprocket wheel 300 and the sprocket wheels 282 and 238 will also be rotated.

Before starting the nailing operation by depressing the foot lever 120, nails are inserted in the passageways 187 in the lower nailing mechanism and in the passageway 248 in the upper nailing mechanism. The nails in the lower passageways 187 drop downwardly until they abut the upper ends of the nail-driving members 228 and the nail in the upper passageway 248 is held in position by the spring biased ball 250, previously described.

The heel lifts are then placed one on top of the other on top of the plate 192, as previously described, so as to form a heel blank 218. This phase of the operation is shown in Figs. 4 and 5.

The foot lever 120 is then depressed, thereby causing the lower ends of the lever members 128 to move to the right, as previously described, thereby permitting the dog member 84 (Fig. 17) to engage the fixed clutch member 76 so as to connect together the two clutch members 76 and 80. This movement of the lever members 128 also causes the upper and lower jaw-like assemblies to pivot inwardly and the cylindrical housing 258 to move into alignment with the upper passageway 248, as previously described. This phase of the operation is shown by comparing Figs. 5 and 6.

Inasmuch as the clutch member 76 rotates continuously, the clutch member 80 will start to rotate in a clockwise direction as viewed in Fig. 6 when the dog member 84 connects together the members 76 and 80. Rotation of the clutch member 80 causes the sprocket wheel 81 to rotate in the clockwise direction, thereby moving the continuous chain 93 so as to rotate the sprocket wheel 300, the sprocket wheel 296 on the upper shaft 104, the idler sprocket wheel 303, and the sprocket wheel 296 on the lower shaft 104, as previously described. As shown in Fig. 6, the stepping on the foot lever 120 causes the foot member 253 to be disposed a short distance above the upper end of the heel blank 218. However, when the sprocket wheel 300 starts to rotate in the counterclockwise direction, the projection on the cam 301 forces the roller 302 rearwardly against the action of the springs 134, thereby pulling the rod 114 rearwardly a short distance so as to bring the ends of the jaw-like assemblies 95 and 96 closer together, whereby the foot member 253 compresses the heel blank 218. This is shown in Fig. 7.

Rotation of the sprocket wheels 296 on the upper and lower shafts 104 rotates the shafts and the sprocket wheels 295 mounted thereon. Rotation of the sprocket wheels 295 causes rotation of the sprocket wheels 282 and 238 which are driven by means of the continuous chains 297 and 298, respectively. Rotation of the sprocket wheels 282 and 238 causes the crank shaft 280 and 236 to rotate, thereby causing the members 278 and 234 to move inwardly, as shown in Fig. 7. Inward movement of the lever 278 causes the nail-driving member 272 to move downwardly in the passageway 248 so as to contact the upper end of the nail disposed therein. Also, the inward or upward movement of the lever member 234 in like manner causes the lower rod-like members 228 to move upwardly in the passageways 187. As the crank shaft 280 continues to rotate in the clockwise direction, and the crank shaft 236 continues to rotate in the counterclockwise direction, the upper nail-driving element 272 and the lower rod-like elements 228 will continue to move inwardly against the heads of the nails disposed in the passageways 248 and 187, respectively, so as to simultaneously drive the nails into the opposite ends of the heel blank 218. The end of the nail driving stroke is shown in Fig. 8.

Continued rotation of the crank shafts 280 and 236 causes the nail-driving elements 272 and 228 to be retracted, as shown in Fig. 9.

When the crank shafts 280 and 236 complete one revolution and the members 278 and 234 are in their outermost position, the cam member 80 of the clutch 74 will also have completed one revolution so that the dog member 84 will be drawn out of engagement with the clutch member 76 by the wedge 169 on the member 90, as previously described, so that rotation of the clutch member 80 will cease. As previously described, just prior to the clutch member 80 making a complete revolution the projection 83 on it will contact the roller 160 on the V-shaped member 159 so as to cause the latch member 150 to be lifted upwardly, thereby permitting the lever members 128 to return to their original position, as shown in Fig. 5. As was previously described, the return of the lever member 128 to its original position permits the rod-like member 114 to move to the left, thereby permitting the jaw-like assemblies 95 and 96 to open. Also, when the jaw-like assemblies 95 and 96 open, the L-shaped member which contains the finger-like elements 181 moves forwardly away from the front end of the stack of heel lifts 218. When the pressure is removed from the front end of the heel blank 218, the spring 216 (Fig. 33), which is connected between the assemblies 204, causes the plates 208 on the inner ends of the rods 206 to move forwardly (Fig. 29) and the finger-like elements 212 to move away from the heel blank 218 thereby releasing it, and permitting its removal for insertion in the clamping reel 304, which will now be described.

The reel 304 (Figs. 1, 2 and 18) is rotatably mounted on a shaft 305 which extends from the right side of the device and includes a wheel member 306 and a ring member 307 fastened thereto. The wheel member 306 contains a hub 308 and radiating spokes 309 (Fig. 18).

Fastened to the spokes 309 adjacent the hub 308 is a sprocket wheel 310 (Figs. 18 and 19), and formed integral with the spokes 309 are an inner ring 312 and an outer ring 314 of L-shaped cross section containing a shoulder 315 (Fig. 20).

Figure 19:
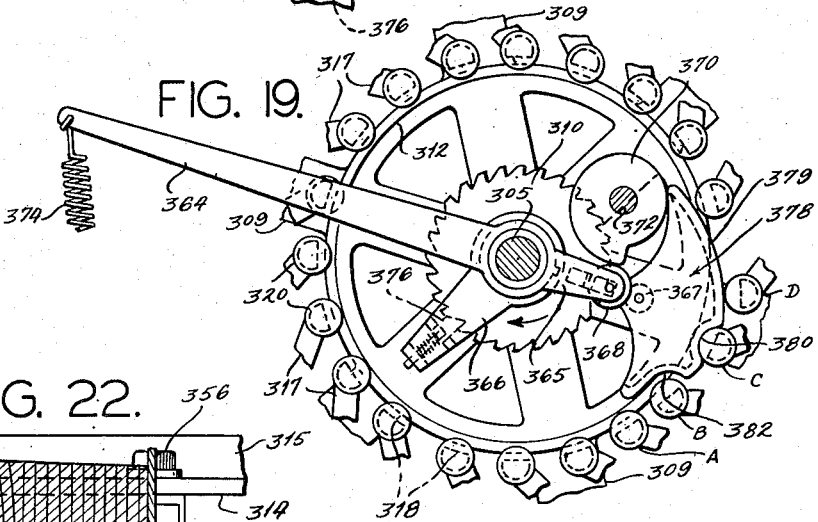
Fig. 19 is a fragmentary view similar to Fig. 18 showing the actuating mechanism in the pivoted position immediately prior to the rotation of the reel at the end of the nailing operation.

A plurality of short shafts 316 extend normal to the vertical portion of the outer ring 314, and pivotally mounted thereon are a plurality of tensioning arms 317 (Figs. 18, 20 and 21). The lower end of each of the tensioning arms 317 contains an arcuate shoulder 318 which is adapted to ride on the inner ring 312 (Figs. 3, 19 and 20). Rotatably mounted on the lower ends of the arms 317 adjacent the shoulders 318 are rollers 320. As shown in Fig. 18, coiled springs 321 are disposed between the arms so as to urge the shoulder 318 towards the ring 312. The springs 321 exert the pressure on the heel blanks 218, as will appear.

Fastened to the upper ends of the tensioning arms 317 which project beyond the outer ring 314 are flexible pressure plate assemblies 322 (Fig. 18).

Each pressure plate assembly 322 comprises a bracket 324 which is removably fastened to the end of a tensioning arm 317 by a setscrew 326 (Figs. 21 and 22). Pivotally mounted on one end of the bracket 324 is an elongated member 328 which has a rectangular shaped opening 329 in the center thereof (Fig. 21). A hairpin-shaped spring 330 extends through the bracket 324 and bears against one face of the member 328 so as to tend to maintain the member 328 normal to the bracket 324. Fastened to the other face of the elongated member 328, as by riveting, is a set of flexible plates (Fig. 22). This set comprises a first spring-like resilient plate 332 immediately adjacent the member 328, which has a crimped edge 333. Adjacent the first plate 332 is a relatively narrow elongated spacer member 334 and adjacent the spacer member 334 is a flat resilient plate 335 of steel or like material. As shown in Fig. 22, the outer crimped edges 333 of the plate 332 bear against the back of the flat plate 335 so as to act as a spring and buttress it. When the pressure plate assembly 322 is forced against the end of a gouged heel blank, the plate 335 flexes so as to conform with its shape so as to be in contact with the entire surface thereof, whereby the holding pressure is distributed over the entire surface instead of being concentrated at its periphery or at only certain parts, as is the case with the plates in use at the present time.

Also, because the plates 335 and their associated members are pivotally mounted on the brackets 324, the plates 335 will adapt themselves to the end of a heel blank regardless of whether it is flat or wedge-shaped.

A slightly modified plate 335A is shown in Fig. 35. It is used in the same manner and is similar to plate 335 except that it has a thin layer of resilient material such as rubber fastened to its face. This construction has the particular advantage that the rubber, or the like, will more readily adapt itself to slight irregularities in the end surface of the heel blank.

Formed in the vertical portion of the outer ring 314 on the wheel member 306 are a series of spaced arcuate slots 336 (Figs. 18 and 25). Extending through all but three of the slots 336 are bolts 338 (Fig. 2) which support the ring member 307 by passing through openings 339 contained in it. This construction permits relative movement between the ring member 307 and the outer ring 314, which is limited only by the length of the slots 336.

The three slots 336 which do not contain the bolts 338 as commented on above, are positioned relatively close together, as shown in Fig. 25, and disposed adjacent them so as to bear on the shoulder 315 of the ring member 306, is an arcuate runner 340. The arcuate runner 340 contains three openings 342, each of which is in alignment with one of the three closely spaced slots 336. As shown in Fig. 27, elongated bolts 344 extend through the openings 339 in the ring member 307, through the slots 336, and through the openings 342 contained in the runner 340. Nuts 345 are disposed on the ends of the bolts 344 to maintain them in position.

Connected between the end bolt 344 (which is slightly longer than the other two) and a bolt 346, fastened to the outer ring 314, is an elongated adjusting member 348 which includes a turn buckle 350 (Fig. 25). Thus, when the turn buckle 350 is rotated, the length of the member 348 is changed and the runner 340 and ring member 307 are moved relative to the outer ring portion 314. This varies the distance between the sets of clamping plates between which the heel blanks 218 are disposed.

An annular groove 352 is formed in the inner face of the ring member 307. This groove receives one end of the pins 316 on which the tensioning arms 317 are rotatably mounted (Figs. 20, 21 and 26).

Mounted on the ring member 307 between it and the outer ring 314 in a manner to be described are a plurality of fixed plate supporting members 353, there being one fixed plate supporting member for each flexible plate assembly 322. Each fixed plate supporting member 353 includes a base block 354 (Figs. 23 and 27) which contains a projection 355 disposed in the groove 352 in the ring member 307. The projection 355 fits snugly in the groove 352 (Fig. 27) so as to maintain the base 354 rigidly in position. Some of the base blocks 354 are mounted on the bolts 344, previously described as extending through the openings in the runner 340, and some are mounted on short machine screws 356 (Fig. 23) which extend through openings formed in the ring member 307.

Brackets 358 are removably mounted on the upper ends of the bases 354 by setscrews 360, and fastened to the brackets 358 are rigid plates 362 (Fig. 23).

Each time the jaw-like nailing assemblies 95 and 96 are brought together so as to drive nails into a heel blank 218, as previously described, the reel member 304 rotates a predetermined distance, releases one heel blank from the clamping action of one set of plates 335 and 362, and moves another set of empty plates 335 and 362 into position to receive a newly nailed heel blank 218. The mechanism for advancing the reel 304 will now be described.

Pivotally mounted on the shaft 305 which supports the reel member 304 (between the nailing mechanism and the reel) is a hub 363 (Fig. 3).

Fixedly mounted on the hub 363 is a first actuating member which contains a long arm portion 364 and a short arm portion 365 diametrically opposite thereto (Figs. 3 and 19). Also fixedly mounted on the hub 363 is a second actuating member which contains a depending ratchet supporting arm 366 and a cam supporting arm 367 (Fig. 3).

Rotatably mounted on the end of the short arm portion 365 is a roller 369 which is disposed below and in engagement with a cam 370. The cam 370 is fixedly mounted on a shaft 372 which is driven from the shaft 299 (Fig. 4) which is rotatably mounted between the portions 66 of the members 60, as previously described. Thus, the cam member 370 is driven indirectly by the continuous chain 93 and the sprocket 81 on the fixed clutch member 80.

Connected between the end of the long arm portion 364 and the base 41 of the machine is a coiled spring 374 which urges the long arm portion 364 downwardly. Mounted on the end of the ratchet arm 366 is a spring biased dog 376 which engages the teeth on the sprocket wheel 310. Thus, when the cam member 370 rotates in the clockwise direction as indicated in Fig. 19, the roller 368 is gradually forced downwardly and the long arm portion 364 is rotated upwardly, thereby stretching the spring 374. At the same time, the ratchet supporting arm 366 is rotated in the clockwise direction so as to move the ratchet dog 376 one tooth on the ratchet wheel 310. When the roller 368 drops off of the high point on the cam 370 onto the low portion thereof, the spring 374 pulls the long arm 364 downwardly and moves the ratchet supporting arm 366 in the counterclockwise direction. This rotates the reel 304 one-twentieth of a revolution, there being 20 ratchet teeth and 20 sets of plates in the device illustrated.

Mounted on the cam supporting arm 367 (Fig. 3) which, as previously described, is formed integral with the ratchet supporting arm 366, is a cam 378 which has an outer arcuate edge containing a curved portion 379 and two notches 380 and 382.

When the cam 370 rotates so as to rotate the long arm portion 364 and the ratchet supporting arm 366 in the clockwise direction, as described above, the cam 378 will also rotate in the clockwise direction in like manner. During this phase of the operation, the reel 304 remains stationary so that the roller 320 of the tensioning arm 317 which was slightly below the lower end of the cam 378 shown at stage A, is now disposed adjacent, but not in, the notch 382 shown at B, the roller of the tensioning arm 317, which was disposed adjacent the notch 382 at B, is now positioned in the notch 380 at C, and the roller of the tensioning arm 317, which was positioned in the notch 380 at C, is now moved onto the arcuate surface 379 at D.

When the reel is unloaded, the roller of the tensioning arm 317, which is adjacent the lower end of the cam 378, will be disposed in the notch 382 whenever the movement occurs as described above. This was found to be advantageous in order to prevent the reel 304 from overrunning the cam 378 when the former is actuated while unloaded.

When the roller 320 of the one tensioning arm 317 moves into the notch 380, the arm is pivoted so as to move its plate assembly 322 away from the rigid plate 362 adjacent thereto, and thereby release the heel blank 218 held between them. As will be described, automatic means are provided for ejecting the heel blank 218 thus released.

The tensioning arm 217, the roller of which was moved from the notch 380 onto the arcuate portion 379 of the cam, is pivoted further to increase the distance between its plate assembly 322 and the rigid plate 362 adjacent thereto so as to receive a newly nailed heel blank 218.

When the tensioning arm 217, which has received a newly nailed heel blank 218, moves upwardly off of the arcuate portion 379 due to further movement of the cam 370, it is pivoted due to the force exerted by the spring 321 bearing against it so as to firmly clamp the heel blank between its plate assembly 322 and the rigid plate 362 adjacent thereto.

When the long arm portion 364 is rotated in the counterclockwise direction by the spring 374, as previously described, the hub 363 and the two actuating members mounted thereon (which include the cam supporting arm 367 and the cam 378) are also rotated in the counterclockwise direction. Thus, as the reel 304 and the actuating arms 317 mounted thereon rotate in the counterclockwise direction, the cam 378 also rotates in like manner so as to maintain the rollers of the arms 317 disposed adjacent the notch 382, in the notch 380, and on the arcuate surface 379 in their same relative positions.

As previously described, the reel 304 remains stationary while the long arm 364 is rotated in the clockwise direction by the action of the cam 370. This is accomplished by a plurality of studs 384 (Fig. 2) which extend outwardly from the inner ring portion 312 and which are engaged by a dog 386 (Figs. 2 and 18), thereby preventing the reel 304 from rotating in the clockwise direction as viewed in Fig. 18.

As mentioned previously, the finished heel blank 218 is ejected from the reel 304 adjacent the point where the one tensioning arm 317 rides onto the cam 378 and into the notch 380, shown as stage C in Fig. 19. The cam 370, which causes the reel 304 to rotate, also actuates the ejecting mechanism which will now be described.

As shown in Fig. 28, a lever arm 388 is pivotally mounted on the lower shaft 104. Rotatably mounted on the upper end of the lever arm 388 is a roller 390 which rides on the cam 370. Pivotally mounted on a cross member 392 at the front of the device, as shown in Fig. 3, is an ejector arm 394, the free end of which is adapted to pass between a flexible plate assembly 322 and the rigid plate 362 adjacent thereto. A short arm 396 extends inwardly from the ejector arm 394 and connected between the free end thereof and the lower end of the lever 388 is an elongated member 398. As shown in Fig. 3, a spring 400 is connected between the member 398 and the cross member 392 so as to return the ejecting arm 394 after it has ejected a stack of lifts 218.

Thus, as the cam 370 is rotated, the lever arm 388 is rotated in the clockwise direction as viewed in Fig. 28, so as to pull the elongated member 398 forwardly. This causes the ejector arm 394 to pivot in the clockwise direction as viewed in Fig. 3, so as to eject the heel blank from between the previously opened set of clamping plates. When the low portion of the cam 370 is reached, the ejector arm 394 is retracted by the spring 400 immediately prior to the rotation of the reel 304.

To briefly summarize the operation of the machine: Starting with the parts as shown in Fig. 5 when the foot lever 120 is depressed, the lever members 128 are actuated so as to cause the jaw-like nailing assemblies 95 and 96 to move together to position the foot 253 adjacent the upper end of the heel blank 218 disposed on the plate 192, and to connect the stationary member 80 of the clutch 74 with the constantly rotating member 76 (Figs. 15, 16 and 17).

As the lower jaw-like nailing assembly 96 moves upwardly, it causes the stack of adjustable finger-like elements 181 to abut the forward edge of the heel blank 218 (Fig. 6). And, as the upper nailing assembly 95 moves downwardly, the tubular housing 258, which contains the rod-like nailing member 272, is moved into alignment with the upper nail receiving passageway 248.

The member 80 of the clutch 74 and the sprocket wheel 81 fastened thereto starts to rotate and to drive the continuous chain 93, which, in turn, causes rotation of the cams 301 and 370 and the sprocket wheels 238 and 282.

The cam 301 causes additional movement of the lever members 128 so as to bring the foot member 253 against the top of the heel blank to slightly compress the same (Fig. 7).

As the cam 370 rotates (Figs. 18 and 19), it starts rotation of the actuating mechanism for rotating the reel 304 so as to cause the ratchet dog 378 to move one tooth on the rachet wheel 310, and it also starts the heel ejecting mechanism in operation.

The rotation of the sprocket wheels 238 and 282 causes the rod-like nail driving members 228 and 272 to move inwardly so as to drive nails into each end of the heel blank 218. As shown and described, one nail is driven into the top and two nails are driven into the bottom of the heel blank, but obviously the machine can be constructed so that any number of nails can be driven into each end of the stack of lifts 218. This is limited only by the size of the members which contain the nail receiving passageways and the number of nail receiving passageways which can be formed in them.

Simultaneously with the driving of the nails into the ends of the heel blank 218, the rotation of the cam 370 produces movement of the cam 378. This causes a first set of previously opened clamping plates on the reel 304 to open wider preparatory to receiving a newly nailed heel blank, and a second set of clamping plates which had been closed to open and release the pressure on a heel blank held between them. At the same time, a third set of clamping plates, which had received a newly nailed heel blank, are brought together so as to compress the heel blank firmly between them.

The same movement of the cam 370 also causes the heel ejecting mechanism to eject the heel blank from between the second set of newly released clamping plates (Figs. 3 and 28).

As the rod-like nailing members 228 and 272 are retracted by further rotation of the sprocket wheels 238 and 282, the roller 368 on the reel actuating mechanism rides onto the lower part of the cam 370 so as to permit the spring 374 to rotate the reel actuating mechanism and the reel 304 a predetermined distance.

As the member 80 of the clutch 74 finishes one complete rotation, it actuates the V-shaped member 159, which raises the latching member 150 and permits the lever members 128 to return to their rest or inoperative position. As the lever members 128 return to their inoperative position (Fig. 5) the jaw-like nailing assemblies 95 and 96 open. The downward movement of the lower nailing assembly 96 causes the stack of finger-like elements 181 to move away from adjacent the rear of heel blank 218 so as to release it and permit it to be removed and placed between the set of clamps on the reel 304 which had been opened to receive it.

Thus, it is apparent that there has been provided a novel heel forming machine which fulfills all of the objects and advantages sought therefor.

It is to be understood that the foregoing description and the accompanying drawings have been given only by way of illustration and example, and that changes and alterations in the present disclosure, which will be readily apparent to one skilled in the art, are contemplated as within the scope of the present invention, which is limited only by the claims which follow.

What is claimed is:

1. In a heel forming machine, a pair of elongated nailing mechanisms mounted on a support so as to extend forwardly therefrom, each of said mechanisms containing a nailing assembly at its free end which includes a member for receiving at least one nail, at least one of said mechanisms being pivotally mounted on the support; means for causing relative movement of the nailing assemblies between a closed position in which the nail receiving members are spaced close together in alignment and an open position in which they are spaced apart; and means for varying the distance between the nail receiving members in the closed position to accommodate heel blanks of various lengths, the nail receiving members remaining in alignment in the closed position regardless of the distance between them; said last-mentioned means including a housing carried by each of said nailing mechanisms and threadably adjustable plungers therein for axially adjusting said nailing assemblies.

2. In a heel forming machine, a pair of pivotally mounted elongated nailing mechanisms having nailing assemblies adjacent the free ends thereof, each nailing assembly including a member for receiving at least one nail, said mechanisms being simultaneously movable between a closed position in which the nail receiving members are spaced close together in alignment and an open position in which said members are spaced apart; means for varying the distance between the nail receiving members in the closed position to accommodate heel blanks of various lengths, the nail receiving members remaining in alignment in the closed position regardless of the distance between them; said last-mentioned means including a housing carried by each of said nailing mechanisms and threadably adjustable plungers therein for axially adjusting said nailing assemblies; and means for driving nails from the nail receiving members into a heel blank disposed between them when the mechanisms are in the closed position.

3. In a heel forming machine, a pair of elongated nailing mechanisms mounted on a support so as to extend forwardly therefrom, each of said mechanisms containing a nailing assembly at its free end which includes a member for receiving at least one nail, at least one of said mechanisms being pivotally mounted on the support; means carried by one of said nailing assemblies for supporting and aligning a stack of lifts between its nail receiving member and the nail receiving member of the other nailing mechanism; means for causing relative movement of the nailing assemblies between a closed position in which the nail receiving members are spaced close together in alignment adjacent opposite ends of an assembled stack of lifts and an open position in which they are spaced apart; and means for driving nails from the nail receiving members into the ends of a stack of lifts when the assemblies are in the closed position; both of said last-mentioned means including a mechanically actuated linkage and a starting lever which is adapted to move said nailing assemblies to a predetermined position upon operation of said starting lever.

4. In a heel forming machine, a pair of elongated nailing mechanisms mounted on a support so as to extend forwardly therefrom, each of said mechanisms containing a nailing assembly at its free end which includes a member for receiving at least one nail, at least one of said mechanisms being pivotally mounted on the support; means carried by one of said nailing assemblies for supporting and aligning a stack of lifts against its nail receiving member between it and the nail receiving member of the other nailing mechanism; power operated means for causing relative movement of the nailing assemblies so as to bring the other nail receiving member adjacent the other end of the stack; power operated means for causing additional relative movement of the nailing assemblies to bring said other nail receiving member against the stack so as to compress the same; power operated means for driving nails from the nail receiving members into the ends of the stack when the latter is compressed; and means for initiating all of said power operated means by a starting lever through a mechanically actuated linkage which is adapted to move said nailing assemblies to a predetermined position upon operation of said starting lever.

5. In a heel forming machine, a pair of elongated nailing mechanisms mounted on a support so as to extend forwardly therefrom, each of said mechanisms containing a nailing assembly at its free end which includes a member for receiving at least one nail, at least one of said mechanisms being pivotally mounted on the support; means on one of said nailing asemblies for supporting a stack of lifts against its nail receiving member and between it and the nail receiving member of the other nailing mechanism; a foot member pivotally mounted at the inner end of said other nailing assembly; means for causing relative movement of the nailing assemblies between a closed position in which the foot member is disposed against the other end of the stack of lifts and an open position in which the foot member is disposed away from the stack; and means for driving nails from the nail receiving members into the ends of the stack when the assemblies are in the closed position.

6. In a heel forming machine, a pair of elongated nailing mechanisms mounted on a support so as to extend forwardly therefrom, each of said mechanisms containing a nailing assembly at its free end which includes a member for receiving at least one nail, at least one of said mechanisms being pivotally mounted on the support; means carried by one of said nailing assemblies for supporting a stack of lifts against its nail receiving member and between it and the nail receiving member of the other nailing mechanism; a foot member pivotally mounted at the inner end of said other nailing assembly; yieldable means urging pivotal movement of the foot member for alignment with said stack of lifts; means for causing relative movement of the nailing assemblies between a closed position in which the foot member is disposed against the other end of the stack of lifts and an open position in which the foot member is disposed away from the stack; and means for driving nails from the nail receiving members into the ends of the stack when the assemblies are in the closed position.

7. In a heel forming machine, a pair of elongated nailing mechanisms pivotally mounted on a support so as to extend forwardly therefrom, each of said nailing mechanisms containing at least two parallel spaced elongated members, individually pivotally mounted on the support, the pivot points of the elongated members of both mechanisms lying in a common plane; each of the nailing mechanisms also containing a nailing assembly containing a nail receiving member pivotally mounted adjacent the free ends of the elongated members, the nail receiving members being parallel with the plane passing through the pivot points of the elongated members; and means for moving the nailing mechanisms between a closed position in which the nail receiving members are spaced close together and an open position in which they are spaced apart.

8. In a heel forming machine, an upper and a lower elongated nailing mechanism pivotally mounted on a common support so as to extend forwardly therefrom, each of said mechanisms including at least two parallel spaced elongated members individually pivotally mounted on the support, the pivot points of the elongated members of both mechanisms lying in a common plane; upper and lower nailing assemblies pivotally mounted adjacent the free ends of the elongated members, the pivot points of the nailing assemblies lying in a plane parallel with the plane passing through the pivot points at the other ends of the elongated members; means for moving the nailing mechanisms between a closed position in which the nailing assemblies are spaced close together and an open position in which they are spaced apart; the upper nailing assembly including a housing, a member containing at least one passageway therethrough for receiving a nail disposed adjacent the lower end of the housing, means for releasably holding a nail in the passageway, means pivotally mounted adjacent the upper end of the housing for driving a nail from the passageway, and means for pivotally moving the nail driving means into alignment with the nail receiving member when the nailing mechanisms are in the closed position and away from it when they are in the open position.

9. In a heel forming machine, a pair of opposed nailing assemblies, each including a member for receiving at least one nail, at least one of said assemblies being movable in a cycle from an open position to a closed position in which the nail receiving members are spaced close together in alignment and back to an open position in which said members are spaced apart, power operated means for causing at least one of said assemblies to move from said open position to said closed position and back to said open position, and a mechanically actuated linkage for engaging through a clutch said power operated means when at least one of said assemblies is in the first of said open positions and automatically disengaging said clutch by a stop means when it is in said second open position at the completion of the cycle.

10. In a heel forming machine, a pair of opposed nailing assemblies, each including a member for receiving at least one nail, at least one of said assemblies being movable in a cycle from an open position to a closed position in which the nail receiving members are spaced close together in alignment and back to an open position in which said members are spaced apart, power operated means for causing at least one of said assemblies to move from said open position to said closed position and back to said open position, and a mechanically actuated linkage for engaging through a clutch said power operated means when at least one of said assemblies is in the first of said open positions and automatically disengaging said clutch by a stop means when it is in said second open position at the completion of the cycle, said mechanically actuated linkage including means for disengaging said stop means when it is returned to the unoperated position.

11. In a heel forming machine, a pair of opposed nailing assemblies, each including a member for receiving at least one nail, at least one of said assemblies being movable in a cycle from an open position to a closed position in which the nail receiving members are spaced close together in alignment and back to an open position in which said members are spaced apart, power operated means for causing at least one of said assemblies to move from said open position to said closed position and back to said open position, and a mechanically actuated linkage for engaging through a clutch said power operated means when at least one of said assemblies is in the first of said open positions and automatically disengaging said clutch by a stop means when it is in said second open position at the completion of the cycle, said mechanically actuated linkage including means for moving at least one of said assemblies from said first open position to a substantially closed position and means for connecting said power operated means to said last-mentioned means to cause at least one of said assemblies to move to a fully closed position and drive nails through said nailing assemblies into a stack of lifts positioned between them when they are in their fully closed position.

12. In a heel forming machine, a pair of opposed nailing assemblies, each including a member for receiving at least one nail, at least one of said assemblies being movable in a cycle from an open position to a closed position in which the nail receiving members are spaced close together in alignment and back to an open position in which said members are spaced apart, power operated means for causing at least one of said assemblies to move from said open position to said closed position and back to said open position, and a mechanically actuated linkage for engaging through a clutch said power operated means when at least one of said assemblies is in the first of said open positions and automatically disengaging said clutch by a stop means when it is in said second open position at the completion of the cycle, said clutch including a self-disengaging means to limit said power operated means to one cycle.

13. In a heel forming machine a pair of elongated nailing mechanisms mounted on a support so as to extend forwardly therefrom, each of said mechanisms containing a nail driving assembly at its free end which includes a member for receiving at least one nail, at least one of said mechanisms comprising an outer nail driving mechanism and an inner nail receiving mechanism, said latter mechanism being pivotally mounted on its support, operating means for moving said supports and their respective nail driving assemblies from an open position in which said inner nail receiving mechanism is moved about its pivot, so that it is out of alignment with its nail driving mechanism for receiving nails at the end adjacent its nail driving mechanism to a closed position, said last-mentioned means including a pivoting means for aligning said nail receiving mechanism with its nail driving mechanism when said nail driving assemblies are moved to their closed position, said operating means including means for driving nails from the nail receiving members into the ends of a stack of lifts positioned between said nailing mechanisms and means for returning said mechanisms to said open position when said nail driving operation is completed.

ERNEST D. SYDOW.

References Cited in the file of this patent

UNITED STATES PATENTS

| Number | Name | Date |
| --- | --- | --- |
| 364,578 | Cummings | June 7, 1887 |
| 547,363 | Stahl | Oct. 1, 1895 |
| 1,361,942 | Wentworth | Dec. 14, 1920 |
| 1,534,048 | Winkley | Apr. 21, 1925 |
| 1,779,510 | Ray | Oct. 28, 1930 |
| 1,898,889 | Parks | Feb. 21, 1933 |
| 2,176,560 | Parks | Oct. 17, 1939 |
| 2,238,988 | Ashworth | Apr. 22, 1941 |
| 2,336,739 | McMahon et al. | Dec. 14, 1943 |

FOREIGN PATENTS

| Number | Country | Date |
| --- | --- | --- |
| 3,155 | Great Britain | Sept. 27, 1873 |
| 270,697 | Germany | Feb. 24, 1914 |
| 301,022 | Germany | Oct. 14, 1917 |